United States Patent [19]
Guarda et al.

[11] Patent Number: 5,783,789
[45] Date of Patent: *Jul. 21, 1998

[54] PROCESS FOR PREPARING PEROXIDIC PERFLUOROPOLYETHERS

[75] Inventors: Pier Antonio Guarda, Turin; Giuseppe Marchionni, Milan, both of Italy

[73] Assignee: Ausimont S.p.A., Milan, Italy

[ * ] Notice: The term of this patent shall not extend beyond the expiration date of Pat. No. 5,777,291.

[21] Appl. No.: 800,017

[22] Filed: Feb. 14, 1997

[30] Foreign Application Priority Data

Feb. 14, 1996 [IT] Italy ............... MI96 A 000278

[51] Int. Cl.$^6$ ............... C07F 1/00; C07C 41/00; C07C 409/00
[52] U.S. Cl. ............... 204/157.6; 204/157.92; 568/560; 568/561
[58] Field of Search ............... 204/157.6, 157.92; 568/560, 561

[56] References Cited

U.S. PATENT DOCUMENTS

| | | | |
|---|---|---|---|
| 3,715,378 | 2/1973 | Sianesi et al. | 260/463 |
| 3,847,978 | 11/1974 | Sianesi et al. | 260/535 H |
| 4,451,646 | 5/1984 | Sianesi et al. | 528/401 |
| 4,858,299 | 8/1989 | Kobayashi et al. | 204/157.92 |
| 5,258,110 | 11/1993 | Sianesi et al. | 204/157.92 |
| 5,354,922 | 10/1994 | Marchionni et al. | 568/560 |

FOREIGN PATENT DOCUMENTS 695775  2/1996  European Pat. Off.

*Primary Examiner*—Kathryn L. Gorgos
*Assistant Examiner*—Edna Wong
*Attorney, Agent, or Firm*—Nikaido Marmelstein Murray & Oram LLP

[57] ABSTRACT

Tetrafluoroethylene oxidation process comprising the step of oxidizing tetrafluoroethylene in solution at temperatures between −80° C. and −50° C. in the presence of ultraviolet radiation, oxygen and perfluoroethane (125) as solvent to obtain peroxidic perfluoropolyethers.

14 Claims, No Drawings

1
PROCESS FOR PREPARING PEROXIDIC PERFLUOROPOLYETHERS

BACKGROUND OF THE INVENTION

1. Field of the Invention

The present invention relates to a process for preparing peroxidic perfluoropolyethers obtained by photooxidation of tetrafluoroethylene in the presence of solvents.

More particularly it refers to a process which does not utilize chlorofluorocarbon solvents which, as well known, have a dangerous impact on the ozone (ODP) and cause greenhouse effect (GWP).

2. Description of the Related Art

It is well known that TFE photooxidation processes at low temperature to produce peroxidic perfluoropolyethers are industrially carried out in CFC solvents, for instance R12. According to international agreements relating to the reduction and to the elimination of CFC from the market, the need to find substitutive solvents was felt.

Said substitutive solvents must allow the carrying out of the synthesis without causing drawbacks compared with the present solvents, in particular with R12 ($CF_2Cl_2$ dichlorodifluoromethane) which is the most utilized solvent due to its optimal performances. The solvent must not produce chain transfer, since, if desidered, one must be able to obtain also a control on the molecular weight. Moreover a substitutive solvent of R12 must allow the obtainment of a polymer having a low content of peroxidic units (PO) with a good productivity. An ideal solvent is the one which allows to obtain performances similar to those obtainable with R12 by operating in the same conditions of reactor volume, gas flow-rate, power of the radiant lamp and reaction temperature.

It is known indeed that in the photooxidation process of tetrafluoroethylene (TFE), in the presence of CFC solvents, polymers with a lower PO can be obtained if the radiant power of the UV lamp is increased or if one works at higher temperatures, the TFE flow-rate and the reactor volume being equal. However the increase of radiant lamp involves higher process costs and the temperature increase implies lower yields.

Therefore the substitutive solvents are to be considered with the same radiant power, reactor configuration, temperature and reactants flow rate. An optimal solvent will be the one which gives the highest productivity with the lowest PO, with the same reaction.

In the patents of the art, as solvents used in the tetrafluoroethylene photooxidation, are mentioned prevailingly specific chlorofluorocarbon or perfluorinated solvents, optionally containing oxygen atoms, and CFC are especially used in the synthesis as preferred solvents. See for instance patents U.S. Pat. No. 4,451,646, U.S. Pat. No. 5,354,922, U.S. Pat. No. 3,847,978 and U.S. Pat. No. 3,715,378.

SUMMARY OF THE INVENTION

The Applicant has unexpectedly and surprisingly found a specific solvent not containing chlorine which is capable of giving a polymer with low content of peroxidic units (PO) and with good productivity, quite comparable to those obtained with R12.

Object of the present invention is an oxidation process of tetrafluoroethylene at temperatures comprised between −80° C. and −50° C., preferably between −70° C. and −50° C., in the presence of UV radiations and pentafluoroethane (125) as solvent.

2
DESCRIPTION OF THE PREFERRED EMBODIMENTS

The radiation utilized, the oxygen and TFE flow-rate are those well known in the art of CFC solvents and are described for instance in U.S. Pat. No. 3,715,378, incorporated herein by reference. The polymers obtained have the following general formula:

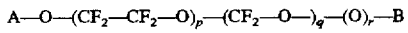

wherein the terminals A and B can be equal to or different from each other and comprise —$CF_3$, —COF, —$CF_2$COF, —$CF_2$X wherein X indicates a radicalic group deriving from the type of the transfer agent utilized, for istance it can be F, Cl, etc.; the indexes p, q and r equal to or different from each other are integers, the sum p+q is a number comprised between 2 and 1000, preferably 10 and 400, the q/p ratio is comprised between 0.1 and 10, preferably between 0.2 and 5, the r/(p+q) ratio is such as to lead to a peroxidic perfluoropolyether having a PO generally lower than 4.5–5, preferably lower than 4, generally comprised between 1 and 3.5. The PO value is expressed as grams of active oxygen (16 amu) (atomic mass unit) per 100 grams of polymer.

The TFE concentration generally ranges between 0.005 and 1 mole per liter of solution, preferably 0.01–0.5 mole/l; therefore the TFE flow-rate is such as to give these concentrations.

The amount of oxygen utilized is sufficient to saturate the solution, generally one operates with an excess of oxygen with respect to TFE and the partial pressures of oxygen are generally comprised between 0.1 and 2 atm, preferably 0.2 and 1.

The process of the invention, if desired, can be carried out in the presence of a chain transfer agent if a control of the molecular weight is desired. As transfer agents, well known in the art, one can mention for instance: fluorine, chlorine, chlorotrifluoroethylene (CTFE), etc.

The peroxidic perfluoropolyethers can be then transformed into products without peroxidic oxygen by means of a thermal treatment at temperatures generally comprised between 100°–250° C. or by UV radiations, in the presence or not of solvents. The so obtained product can be submitted to fluorination treatment to obtain perfluoropolyether with perfluoroalkylic terminals.

Alternatively the peroxidic crude product can be submitted to chemical reduction and to successive transformation reactions to obtain functional products. See for instance U.S. Pat. No. 3,715,378. The chemical reduction is for instance carried out according to methods described in U.S. Pat. No. 4,451,646, 3,847,978. The derivative thus obtained in the form of salt of the carboxylic acid can be submitted to decarboxylation processes in the presence of hydrogen donors substances, among which glycols, water, etc., to obtain perfluoropolyethers having both terminals —$OCF_2H$. See for instance European patent application EP 95111906.4 in the name of the Applicant.

A further object of the present invention is a solvent containing as essential component pentafluoroethane in admixture with linear or branched perfluoroalkanes, for instance from 3 to 7 carbon atoms among which perfluoropropane and/or perfluoroheptane can be mentioned. The volume ratios between 125 and the other indicated perfluorinated solvent generally range from 9:1 to 1:7, preferably from 1:1 to 4:1. The mixtures of solvents show PO and productivity values similar to those of 125. This is quite unexpected if it is considered that perfluoroheptane alone for instance leads to very high PO values and therefore to very low productivity if comparisons are made with the same PO.

In the case of the synthesis of peroxidic polymers having a high molecular weight, it is preferable, according to a preferred embodiment of the invention, to utilize the mixtures of solvents indicated above. According to the present invention, when it is mentioned the molecular weight, it is meant a number average molecular weight.

The following examples are given for illustrative purposes and are not limitative of the present invention.

EXAMPLE 1

In a cylindric reactor for photosynthesis, equipped inside with coaxial sheaths, containing a 150 W high pressure mercury lamp, cooled by recirculation of fluid transparent to UV radiations, equipped moreover with refrigerant maintained at the temperature of −75° C. and of feeding pipes for feeding the reacting gas, is cooled at −50° C. and charged with 415 cc of hydropentafluoroethane (R125).

12.0Nl/h of oxygen have started to be fed and after few minutes the mercury lamp is turned on.

6.0Nl/h of tetrafluoroethylene and 0.040Nl/h of chlorine diluted with 2.4Nl/h of nitrogen are then fed.

These input are kept constant for the whole test, equal to 300 minutes, as well as the temperature (−50° C.).

At the end of the reaction the lamp is turned off, the reactants flows are closed and the solvent and the gaseous by-products are let evaporate until reaching room temperature. The oil remained in the reactor is discharged and degassed under vacuum to eliminate the residual traces of solvent and by-products; weighed, it results equal to 67.8 g, which corresponds to a specific productivity of 33 g/h/l. The iodometric analysis of the peroxidic content indicates a PO equal to 1.84 (expressed as grams of active oxygen/100 g of product). The kinematic viscosity at 20° C. of the product results equal to 600 cSt. The $^{19}$F—NMR analysis confirms the following structure:

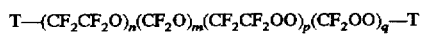

T—(CF$_2$CF$_2$O)$_n$(CF$_2$O)$_m$(CF$_2$CF$_2$OO)$_p$(CF$_2$OO)$_q$—T wherein T=OCF$_2$Cl, OCF$_2$CF$_2$Cl, OCF$_3$, OCF$_2$COF, OCOF.

The (p+n)/(q+m) ratio is equal to 0.94 and the n/m ratio is equal to 0.74.

The number average molecular weight calculated by the $^{19}$F—NMR spectrum is equal to 12800.

EXAMPLE 1A (Comparative)

In the same reactor of Example 1 cooled at −50° C., 440 cc of dichlorodifluoromethane are introduced. 12.0 Nl/h of oxygen are fed and after few minutes the mercury lamp is turned on. 6.0 Nl/h of tetrafluoroethylene are then fed for the whole test (300 minutes) by maintaining the temperature at −50° C. When the reaction is over the lamp is turned off, the reactants flows are closed and the solvent and the reaction by-products are let evaporate. The oil remained in the reactor, after degassing, results equal to 70.8 g which corresponds to a specific productivity of 32 g/h/l. The PO results equal to 1.66 and the viscosity at 20° C. equal to 350 cSt. The $^{19}$F—NMR indicates a structure similar to the one reported in Example 1, with the same type of terminals. The (p+n)/(q+m) ratio results equal to 0.81 and the n/m one equal to 0.67. The average molecular weight calculated by NMR is equal to 10300.

EXAMPLE 2

420 cc of hydropenta-fluoroethane (R125) are introduced in the reactor of Example 1 at the temperature of −50° C. One operates with the same procedure as in Example 1, by feeding 18.8 Nl/h of oxygen, 9.0 Nl/h of tetrafluoroethylene and 0.040 Nl/h of chlorine diluted in a stream of 2.4 Nl/h of nitrogen.

After 300 minutes of reaction 99.5 g of product (corresponding to a specific productivity of 47 g/h/l), having PO=1.88 and viscosity equal to 4700 cSt, are obtained. The NMR analysis indicates a structure similar to that of Example 1, with (p+n)/(q+m) ratio=1.27 e n/m=1.04 and molecular weight equal to 26700.

EXAMPLE 2A (Comparative)

440 cc of dichlorodifluoromethane are introduced in the reactor of Example 1 at the temperature of −50° C. One operates with the same procedure as in Example 1, by feeding 18.0 Nl/h of oxygen and 9.0 Nl/h of tetrafluoroethylene for 300 minutes. 103.5 g of oil (corresponding to a specific productivity of 47 g/h/l), having PO=2.02 and viscosity equal to 1380 cSt are obtained. The NMR analysis indicates a structure similar to that of Example 1, with (p+n)/(q+m) ratio=1.07 e n/m=0.84 and molecular weight equal to 17300.

EXAMPLE 3

400 cc of hydropentafluoroethane are introduced in the reactor of Example 1 at the temperature of −50° C. One operates with the same procedure as in Example 1, by feeding 24.0 Nl/h of oxygen, 12.0 Nl/h of tetrafluoroethylene and 0.060 Nl/h of chlorine diluted in a stream of 2.4 Nl/h of nitrogen. After 300 minutes of reaction 144.4 g of product (corresponding to a specific productivity of 73 g/h/l), having PO=2.45 and viscosity equal to 2300 cSt, are obtained. The NMR analysis indicates a structure similar to that of Example 1, with (p+n)/(q+m) ratio=1.55 e n/m=1.21 and average molecular weight equal to 20700.

EXAMPLE 3A (Comparative)

440 cc of dichlorodifluoromethane are introduced in the reactor of Example 1 at the temperature of −50° C. One operates with the same procedure as in Example 1, by feeding 24.0 Nl/h of oxygen and 12.0 Nl/h of tetrafluoroethylene for 300 minutes. 166 g of product (corresponding to a specific productivity of 76 g/h/l), having PO=2.65 and viscosity equal to 7160 cSt, are obtained. The NMR analysis indicates a structure similar to that of Example 1, with (p+n)/(q+m) ratio=1.44 e n/m=1.04 and average molecular weight equal to 31000.

EXAMPLE 4

430 cc of a 1:1 mixture by volume of perfluoropropane and R125 are introduced in the reactor of Example 1 at the temperature of −50° C., wherein 5.3 g of product obtained in Example 1, used as activator, were previously dissolved. One operates as in Example 1, by feeding 12.0 Nl/h of oxygen, 6.0 Nl/h of TFE and 0.021 Nl/h of chlorotrifluoroethylene diluted in a stream of 0.7 Nl/h of nitrogen. After 240 minutes of reaction 77.9 g of polymer (corresponding to a specific productivity of 45 g/h/l), having PO=2.57 and viscosity equal to 2500 cSt, are obtained. The NMR analysis indicates a structure similar to that of Example 1, with (p+n)/(q+m) ratio=1.69 e n/m=1.18 and average molecular weight equal to 21400.

EXAMPLE 4

(Comparative)

420 cc of R12 are introduced in the reactor of Example 1 at the temperature of −60° C., wherein 5.3 g of product obtained in example 1, used as activator, were previously dissolved. One operates as in Example 1, by feeding 12.0 Nl/h of oxygen and 6.0 Nl/h of TFE. After 240 minutes of reaction 76.9 g of polymer (corresponding to a specific productivity of 46 g/h/l), having PO=2.53 and viscosity equal to 2100 cSt, are obtained. The NMR analysis indicates a structure similar to that of example 1, with (p+n)/(q+m) ratio=1.65 e n/m=1.17 and average molecular weight equal to 20000.

EXAMPLE 5

430 cc of a 1:1 mixture by volume of perfluoropropane and R125 are introduced in the reactor of Example 1 at the temperature of −60° C., wherein 6.6 g of product obtained in Example 1, used as activator, were previously dissolved. One operates as in Example 1, by feeding 18.0 Nl/h of oxygen, 9.0 Nl/h of TFE and 0.021 Nl/h of chlorotrifluoroethylene diluted in a stream of 0.7 Nl/h of nitrogen. After 240 minutes of reaction 123.8 g of polymer (corresponding to a specific productivity of 72 g/h/l), having PO=3.48 and viscosity equal to 100000 cSt, are obtained. The NMR analysis indicates a structure similar to that of example 1, with (p+n)/(q+m) ratio=2.87 and n/m=1.73.

EXAMPLE 6

410 cc of a 20:80 mixture by volume respectively of perfluoropropane and R125 are introduced in the reactor of Example 1 at the temperature of −600° C., wherein 4.5 g of product obtained in Example 1, used as activator, were previously dissolved. One operates as in Example 1 by feeding 18.0 Nl/h of oxygen, 9.0 Nl/h of TFE and 0.030 Nl/h of chlorotrifluoroethylene diluted in a stream of 1.0 Nl/h of nitrogen. After 240 minutes of reaction 116.9 g of polymer (corresponding to a specific productivity of 71 g/h/l), having PO=3.21 and viscosity equal to 25000 cSt, are obtained. The NMR analysis indicates a structure similar to that of Example 1, with (p+n)/(q+m) ratio=2.49 and molecolar weight equal to 48000.

EXAMPLE 7

430 cc of a 20:80 mixture by volume respectively of perfluoropropane and R125 are introduced in the reactor of Example 1 at the temperature of −600° C., wherein 5.6 g of product obtained in Example 1, used as activator, were previously dissolved. One operates as in Example 1, by feeding 18.0 Nl/h of oxygen, 9.0 Nl/h of TFE and 0.030 Nl/h of chlorotrifluoroethylene diluted in a stream of 1.0 Nl/h of nitrogen. After 240 minutes of reaction 125.8 g of polymer (corresponding to a specific productivity of 73 g/h/l), having PO=3.75 and viscosity equal to 24000 cSt, are obtained. The NMR analysis indicates a structure similar to that of Example 1, with (p+n)/(q+m) ratio=3.50 and n/m=1.95 and molecolar weight equal to 47000.

EXAMPLE 7A (Comparative)

430 cc of R12 are introduced in the reactor of Example 1 at the temperature of −60° C., wherein 6.0 g of product obtained in Example 1, used as activator, were previously dissolved. One operates as in Example 1, by feeding 18.0 Nl/h of oxygen, 9.0 Nl/h of TFE and 0.021 Nl/h of chlorotrifluoroethylene diluted in a stream of 0.7 Nl/h of nitrogen. After 240 minutes of reaction 125.5 g of polymer (corresponding to a specific productivity of 75 g/h/l), having PO=3.44 and viscosity equal to 5500 cSt, are obtained.

The NMR analysis shows a structure similar to that of Example 1, with (p+n)/(q+m) ratio=2.48 and n/m=1.65 and molecolar weight equal to 28000.

We claim:

1. Tetrafluoroethylene oxidation process comprising the step of oxidizing tetrafluoroethylene in solution at temperatures comprised between −80° C. and −50° C. in contact with ultraviolet (UV) radiation, oxygen and perfluoroethane (125) as solvent to obtain peroxidic perfluoropolyethers.

2. Tetrafluoroethylene oxidation process according to claim 1 is carried out at temperatures comprised between −70° C. and −50° C.

3. Tetrafluoroethylene oxidation process according to claim 1, wherein the peroxidic perfluoropolyethers obtained have the following formula:

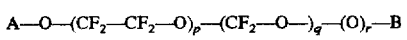

wherein the terminals A and B are equal to or different from each other and comprise —CF$_3$, —COF, —CF$_2$COF, —CF$_2$X wherein X is F or Cl; p, q and r indexes equal to or different from each other are integers; sum of p+q is a number comprised between 2 and 1000; q/p ratio is comprised between 0.1 and 10; r/(p+q) ratio leads to a peroxidic perfluoropolyether having a peroxidic unit (PO) lower than 4.5–5.

4. Tetrafluoroethylene oxidation process according to claim 3, wherein the sum of p+q is a number comprised between 10 to 400; the q/p ratio is comprised between 0.2 and 5; the r/(p+q) ratio leads to the peroxidic perfluoropolyether having a PO comprised between 1 and 3.5.

5. Tetrafluoroethylene oxidation process according to claim 1, wherein a tetrafluoroethylene concentration ranges from 0.005 and 1 mole per liter of solution and oxygen partial pressures are comprised between 0.1 and 2 atm.

6. Tetrafluoroethylene oxidation process according to claim 1, wherein peroxidic perfluoropolyethers are submitted to a thermal treatment at temperatures comprised between 100 and 250° C. or by the UV radiation, optionally in contact with solvents to obtain perfluoropolyethers.

7. Tetrafluoroethylene oxidation process according to claim 6, wherein the obtained perfluoropolyethers are submitted to a fluorination treatment to obtain perfluoropolyethers with perfluoroalkylic terminals.

8. Tetrafluoroethylene oxidation process according to claim 6, wherein the obtained perfluoropolyethers are submitted to chemical reduction and to subsequent transformation reactions to obtain functional perfluoropolyethers products.

9. Tetrafluoroethylene oxidation process according to claim 8, wherein the functional perfluoropolyethers are carboxylic acid salts, optionally submitted to decarboxylation processes in contact with hydrogen-donor substances to obtain perfluoropolyethers having both terminals —OCF$_2$H.

10. Tetrafluoroethylene oxidation process according to claim 1, wherein the solvent contains in admixture linear or branched perfluoroalkanes.

11. Tetrafluoroethylene oxidation process according to claim 10, wherein the perfluoroalkanes have from 3 to 7 carbon atoms.

12. Tetrafluoroethylene oxidation process according to claim 11, wherein the perfluoroalkanes are selected from the group consisting of perfluoropropane, perfluoroheptane and mixtures thereof.

13. Tetrafluoroethylene oxidation process according to claim 10, wherein ratios by volume between the pentafluoroethane and perfluorinated solvent range between 9:1 and 1:7.

14. Tetrafluoroethylene oxidation process according to claim 13, wherein ratios by volume between the pentafluoroethane and the perfluorinated solvent range between 1:1 and 4:1.

\* \* \* \* \*